United States Patent [19]

Cerny et al.

[11] Patent Number: 4,501,347
[45] Date of Patent: Feb. 26, 1985

[54] SEGMENTED DISC BRAKE PAD

[75] Inventors: Frank T. Cerny, Ramsey, N.J.; Irving Lapsker, Monroe, N.Y.

[73] Assignee: Abex Corporation, Stamford, Conn.

[21] Appl. No.: 511,353

[22] Filed: Jul. 6, 1983

Related U.S. Application Data

[63] Continuation-in-part of Ser. No. 418,506, Sep. 15, 1982, abandoned.

[51] Int. Cl.³ .............................................. F16D 69/00
[52] U.S. Cl. ............................ 188/250 G; 188/251 M; 192/107 M
[58] Field of Search .................... 188/73.1, 234, 250 B, 188/250 E, 250 G, 251 M, 255; 192/107 M, 107 R

[56] References Cited

U.S. PATENT DOCUMENTS

| | | | |
|---|---|---|---|
| 1,919,168 | 7/1933 | Perks | 188/250 B X |
| 2,158,337 | 5/1939 | Rasmussen | 188/250 G X |
| 2,451,326 | 10/1948 | Eksergian et al. | 188/234 |
| 2,451,329 | 10/1948 | Gaenssle | 188/234 |
| 2,844,230 | 7/1958 | Armstrong | 188/250 B X |
| 2,965,205 | 12/1960 | Winchell | 192/107 R X |
| 3,037,860 | 6/1962 | Masterson et al. | 192/107 M X |
| 3,198,294 | 8/1965 | Stacy | 188/234 |
| 3,297,117 | 1/1967 | Freholm | 188/234 |
| 3,841,949 | 10/1974 | Black | 188/251 M X |

FOREIGN PATENT DOCUMENTS

| | | | |
|---|---|---|---|
| 673848 | 10/1929 | France | 188/250 G |
| 1115443 | 5/1968 | United Kingdom | 188/250 B |

Primary Examiner—Duane A. Reger
Attorney, Agent, or Firm—Mueller and Smith

[57] ABSTRACT

A disc brake pad comprises a plurality of sintered metallic friction elements, each having a braking surface area of less than 2 in² (12.6 cm²) which are individually mounted on a steel plate or on a flexible carrier plate which is riveted at spaced points about its periphery to the back plate.

6 Claims, 11 Drawing Figures

4,501,347

SEGMENTED DISC BRAKE PAD

This is a continuation-in-part of application Ser. No. 418,506, filed Sept. 15, 1982 now abandoned.

BACKGROUND OF THE INVENTION

This invention relates generally to disc brakes and more specifically to railroad disc brake pads.

Railroad disc braking is quite common in Europe. Pads currently commercially available in Europe all conform to standards set by the UIC (Union Internationale Chemin de Fer). These pads usually feature a single organic composition friction element rigidly mounted on a steel back plate and having a series of grooves formed in the braking surface. Such composition pads have two disadvantages: difficulty in meeting performance standards during wet operation and poor survivability when subjected to severe braking conditions.

Other types of disc brake pad configurations have been developed. In one form, several large blocks of composition friction material are mounted rigidly to a steel back plate. Pads have been developed which feature several large composition friction elements mounted on a flexible carrier plate which is yieldingly attached to a steel back plate, with a layer of rubber interposed between the carrier plate and the back plate. This arrangement, shown in U.S. Pat. Nos. 2,451,326; 2,451,329 and 3,198,294, allegedly permits the several separate elements to move independently and thus better conform to a mating disc surface. In another form of this type pad, the rubber material is removed and the back plate is provided with protuberances beneath each element to permit individual pivotal movement of the elements, as shown in U.S. Pat. No. 3,297,117. These pads have proved to be unduly complex, expensive to manufacture and have not been commercially successful.

Thus, it is an object of this invention to provide a disc brake pad having good wet performance and improved survivability during severe braking conditions.

SUMMARY OF THE INVENTION

Our Assignee recently developed an iron-base sintered metallic friction material for use in railroad tread brakes. This material exhibits vastly improved wet performance and is quite durable. We attempted to use this material in the standard UIC disc pad configuration for disc braking. Although general performance was improved as expected, severe braking produced localized heating, known as "firebanding", in the mating disc. During extensive experimentation with various configurations we developed, in one configuration, a disc brake pad having a plurality of sintered metallic friction elements or segments, each having a braking surface area of less than 2 in$^2$ (12.6 cm$^2$) which are mounted on a flexible carrier plate that is attached to a steel back plate. In a preferred embodiment of this configuration, these elements are of regular hexagonal shape and each has a braking surface area of approximately 1.5 in$^2$ (9.4 cm$^2$). In another configuration, the sintered metallic friction elements have a circular braking surface having an area of approximately 1.3 in$^2$ (8.6 cm$^2$), with a height of approximately 0.7 in (1.8 cm). It has been found that using these small elements eliminates "fire-banding" and that the ratio of height to surface area affects braking "squeal" or noise. It was determined that a ratio not exceeding 0.6 eliminated or reduced "squeal".

DESCRIPTION OF THE DRAWINGS

Further objects, features and advantages of this invention will become more readily apparent upon reference to the following detailed description of the invention, as shown in the accompanying drawings, in which.

DESCRIPTION OF THE INVENTION

Figure 1:
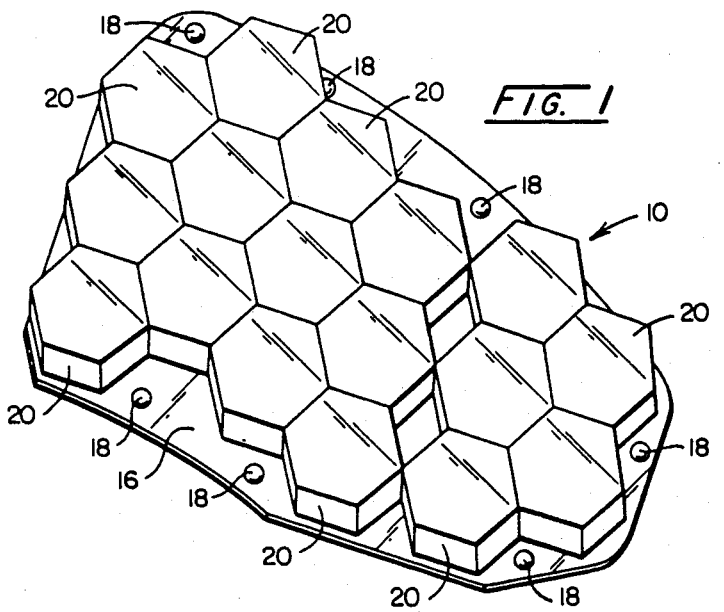
FIG. 1 is a perspective view of one configuration of a disc brake pad according to this invention.
Figure 2:
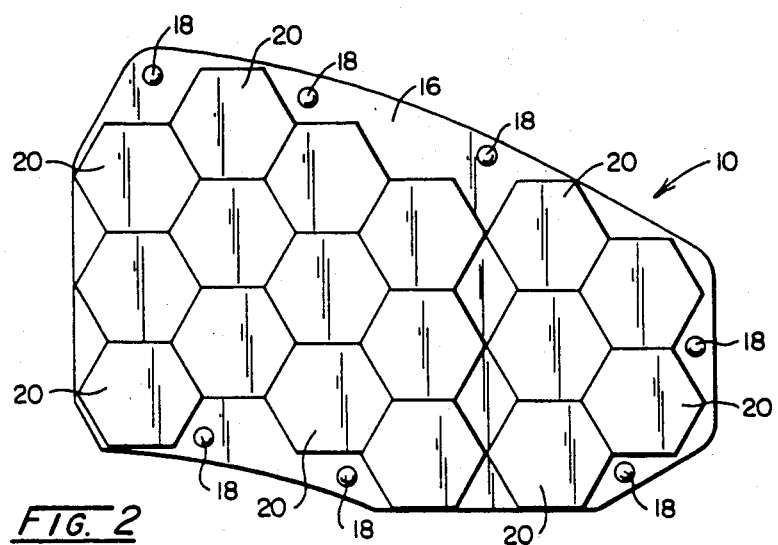
FIG. 2 is a top view of the disc brake pad of FIG. 1.
Figure 3:
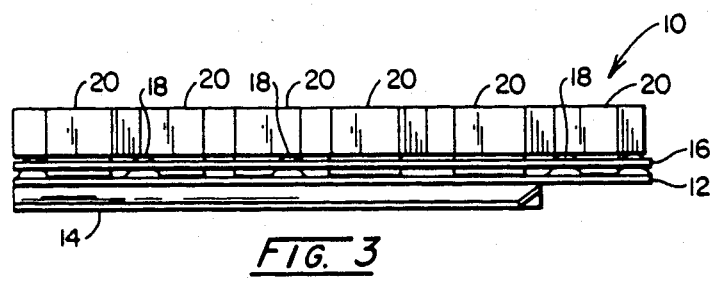
FIG. 3 is a front elevation of the disc brake pad of FIG. 1.
Figure 4:
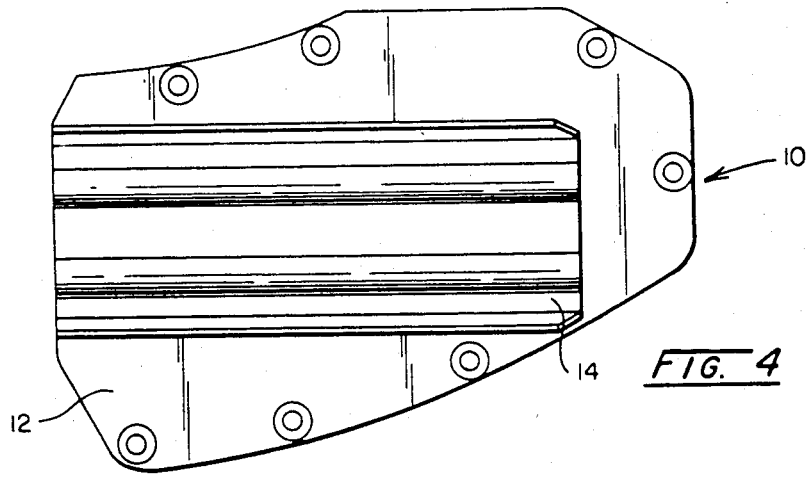
FIG. 4 is a bottom view of the disc brake pad of FIG. 1.

FIGS. 1–4 show a disc brake pad 10 having the approximate size and configuration of a standard UIC 200 cm$^2$ pad. The pad 10 comprises a steel back plate 12 which has a conventional dove-tail mounting bracket 14 secured to its bottom side. A flexible sheet metal carrier plate 16 overlies the back plate and is attached thereto at spaced points by rivets 18. A plurality of sintered metal friction elements 20 are secured to the carrier plate, as will be later described. In the embodiment shown, 17 of these elements 20 are provided, which all have an identical regular hexagonal shape. The elements 20 are arranged in a nesting pattern and are each independently mounted on the carrier plate.

Figure 5:
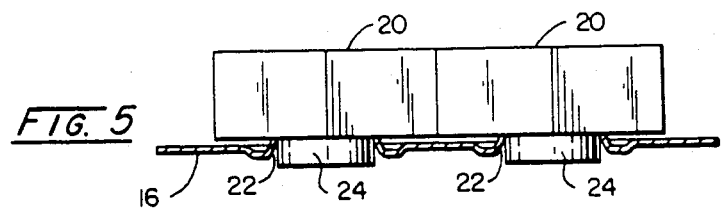
FIG. 5 is an enlarged detail view showing two friction elements of the pad shown in FIGS. 1–4 mounted on a carrier plate, but before attachment thereto.
Figure 6:
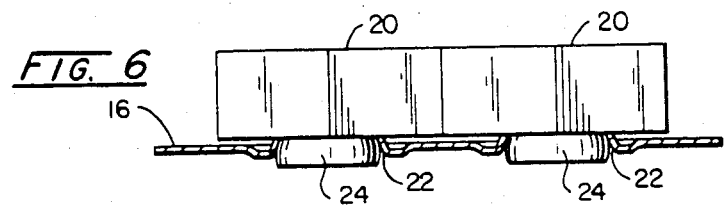
FIG. 6 is a view similar to FIG. 5 but showing the elements after attachment to the carrier plate.

Referring now to FIG. 5, the carrier plate 16 is provided with a plurality of circular apertures 22, one for each friction element. Each element 20 includes a cylindrical short stem 24 that is received within the aperture 22. After all the elements are mounted on the carrier plate, the assembly is placed in a press which then upsets the stems 24 to secure the elements to the carrier plate, as shown in FIG. 6.

Figure 7:
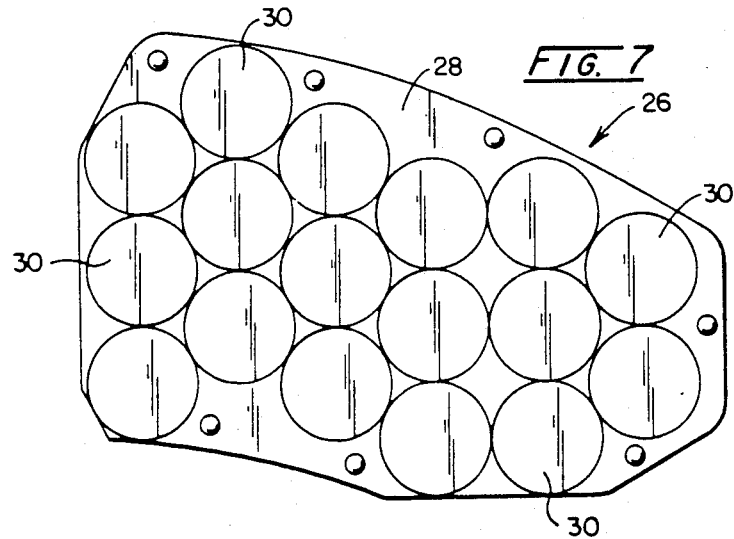
FIG. 7 is a top view of a modified form of the disc brake pad shown in FIGS. 1–4.

As a result of experimentation, we have discovered that the optimum shape for these elements is hexagonal. Of course, they could be triangular, square or any other shape. FIG. 7 shows an alternative embodiment, wherein the disc brake pad 26 and its carrier plate 28 mount a plurality of circular friction elements 30. The hexagonal shape was chosen to provide the greatest amount of back plate coverage by the elements, while providing element corners having an included angle of greater than 90°. This reduces the chance of cracking which can occur with sharp corners of 90° or less, as would be the case with squares or triangles.

It appears that the size of the individual elements affects the performance of the pad. We have had limited success with elements having a braking surface area of approximately 2 in$^2$ (12.6 cm$^2$), but we have found the optimum size of these elements to be approximately 1.5 in² (9.4 cm²) or smaller. Although we do not fully understand the reasons, testing has shown that a disc brake pad according to this invention reduces fire-banding of the disc during severe braking conditions. It is felt that perhaps the independent mounting of a plurality of small friction elements on a flexible carrier plate enables a better conformation of the friction material to the mating disc surface.

Modification of the FIGS. 1–7 embodiments within the scope of our invention could include the provision of a layer of fiberglass, kaowool or other resilient material in the spaces between the element stems 24 for noise attenuation purposes. Other modifications which could be made would be spot welding the carrier plate to the back plate at spaced points instead of riveting. Also, the carrier plate could be brazed at its periphery to the back plate. Other means could also be used to mount the friction elements to the carrier plate, such as by welding or any other conventional mechanical means of attachment.

Figure 8:
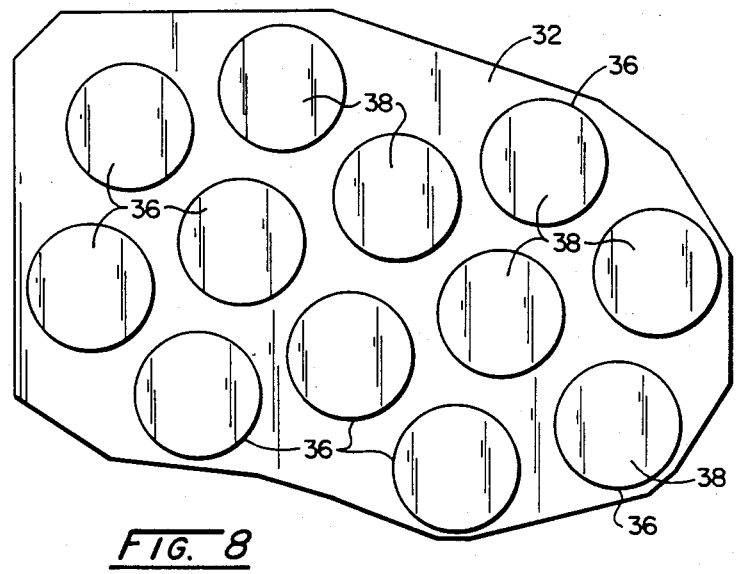
FIG. 8 is a top view of another configuration of a disc brake pad according to this invention.
Figure 9:
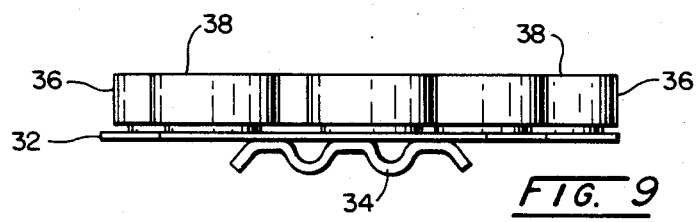
FIG. 9 is an end view of the disc brake pad of FIG. 8.

In an attempt to simplify the FIGS. 1–7 configuration of our invention, we developed the preferred configuration shown in FIGS. 8 and 9. Here the steel back plate 32 again has a conventional dove-tail mounting bracket 34 secured to its bottom side.

Figure 10:
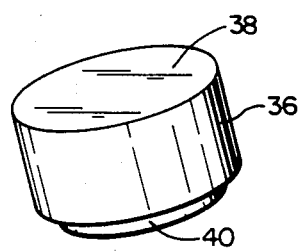
FIG. 10 is a perspective view of one of the friction elements of the pad shown in FIGS. 8 and 9.

Generally cylindrical sintered metallic friction elements 36 are mounted on the top side of back plate 32. As shown in FIG. 10, elements 36 have a circular braking surface 38 and a necked-down base 40. Elements 36 are first compacted, sintered and then mounted on back plate 32 by brazing or welding. Of course, they could be mechanically bonded to the back plate in the same manner as elements 20 are attached to carrier plate 16 in the FIGS. 1–7 configuration. This would require an apertured back plate.

Through experimentation it has been found that the size of the elements affects the performance of the pad with respect to the fire-banding and brake squeal, or noise. As previously noted, the individual elements should have a braking surface area less than 2 in² (12.6 cm²) and preferably 1.5 in² (9.4 cm²) or less to prevent fire-banding. It has further been found that, in the FIGS. 8 and 9 configuration, noise is affected by the ratio of the height of the element in relation to its braking surface area. We have found that ratios not exceeding 0.6 produce pads which exhibit negligible or no brake squeal. For example, a FIG. 10 element which exhibits no fire-banding and little noise has a braking surface area of 1.3 in² (8.6 cm²) and a height of 0.7 in. (1.8 cm), with a resulting ratio of 0.54.

Figure 11:
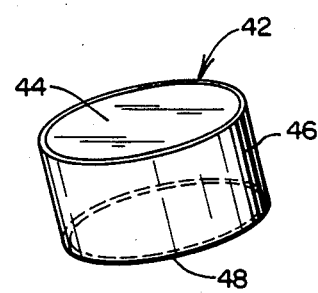
FIG. 11 is a perspective view of a modified form of the element shown in FIG. 10.

We have also discovered that the sintered friction elements disclosed herein maintain their structural integrity if they are compacted densely enough. However, less densely compacted elements require some external support to maintain structural integrity. FIG. 11 shows a friction element 42 having a less densely compacted, cylindrical, sintered metallic friction material core 44 that is encased by a thin, e.g., 0.08 in. (0.2 cm), steel jacket having a cylindrical side portion 46 and a circular bottom 48. Element 42 does not include the necked-down base portion of element 36. Testing has shown that both shapes are effective.

A further modification effectively tested is identical to element 42, but with a denser material core 44 and no cylindrical jacket 46. It includes only the circular thin steel base 48 which has proved to improve the bond with back plate 32 under some processing conditions.

What is claimed is:

1. A disc brake pad for railroad use comprising a rigid back plate having a top side and a bottom side; a mounting bracket secured to the bottom side of the back plate; a flexible metallic carrier plate attached to the top side of the back plate; a plurality of individual friction elements each having a braking surface area of less than two square inches, and a height to braking surface area ratio not exceeding 0.6 and each of the friction elements is mechanically attached to the flexible metallic carrier plate to allow the individual elements to flex when they engage a disk to enable them to more fully engage the braking surface.

2. The disc brake pad of claim 1, wherein the flexible carrier plate includes a plurality of apertures and each of the friction elements has a top disc engaging friction surface and a necked down stem, wherein the stem has a smaller diameter than the top surface and the stem is received in one of the carrier plate apertures.

3. The disc brake pad of claim 2 wherein each of the stems is upset to secure the friction element to the carrier plate.

4. The disc brake pad of claim 2, wherein the friction material is an iron-based sintered metallic material.

5. The disc brake pad of claim 1 wherein the height of the friction material above the carrier plate is less than about 0.7 inches (1.8 centimeters).

6. A disc brake pad for railroad use comprising a rigid back plate having a top side and a bottom side, a mounting bracket secured to the bottom side of the back plate, a plurality of individual metallic containers filled with friction material attached to the top side of the back plate wherein the braking surface area of the friction material in each container is less than two square inches and ratio of the height of the friction material within a container to the braking surface area is less than 0.6.

* * * * *